United States Patent Office 2,705,641
Patented Apr. 5, 1955

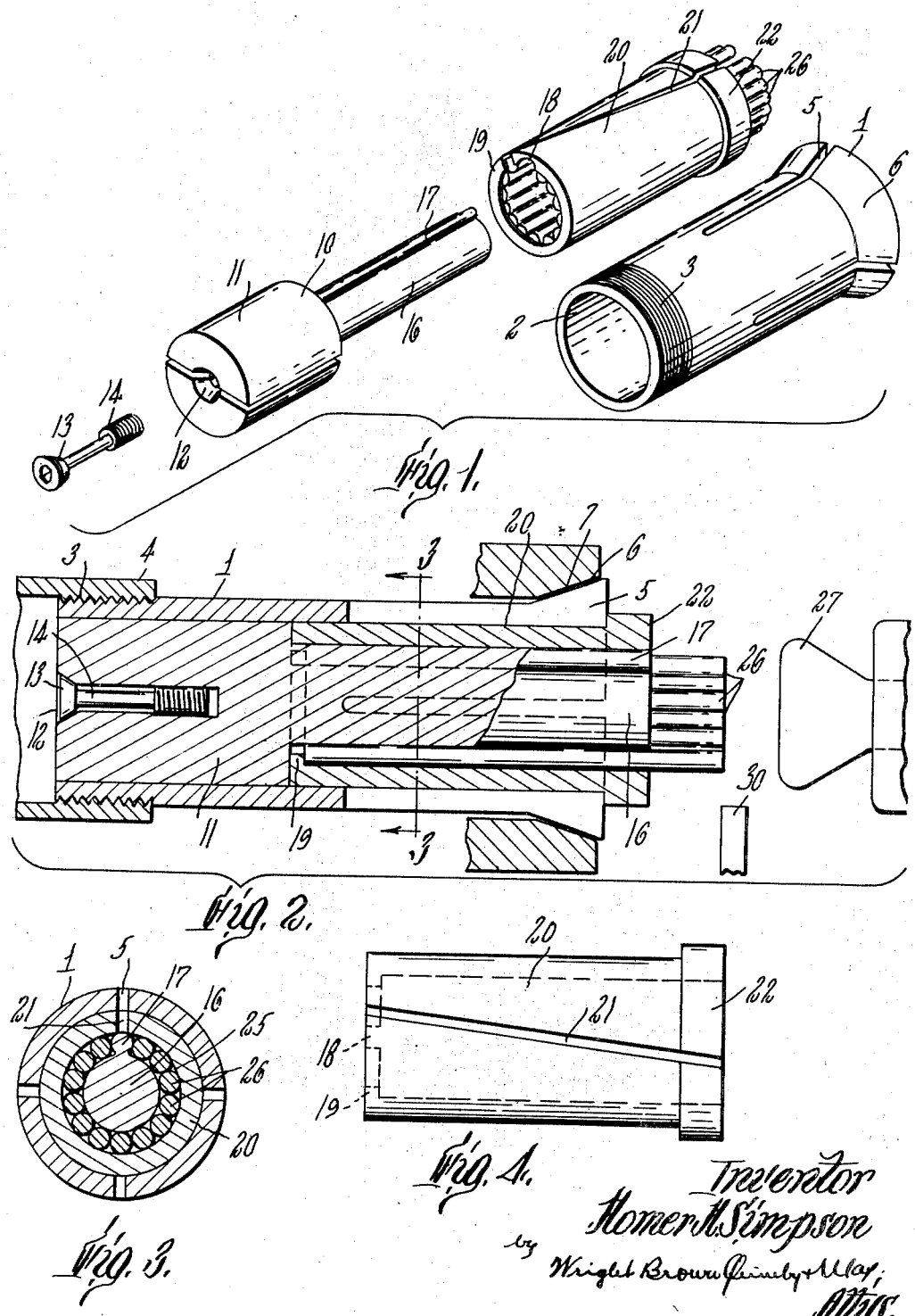

2,705,641

METAL WORK PIECE HOLDER

Homer Hurshel Simpson, Allston, Mass.

Application February 10, 1954, Serial No. 409,366

4 Claims. (Cl. 279—41)

This invention has for an object to hold a plurality of work pieces in a single holder so that a tool may operate thereon in the same relationship to all of the work pieces. More specifically it facilitates the cutting off of a plurality of cylindrical work pieces to equal lengths at each tool presentation.

A further object is to provide means for holding the work pieces in circular array about the rotational axis of the holder so that each piece is eccentric to such axis. With this arrangement, each work piece is cut off smoothly without the possibility of the formation of a central rough portion often produced by final breaking off of a work piece adjacent to its axis of rotation.

Still another object of the invention is to make use of well known work-gripping elements and to apply special parts only when necessary. To this end a standard collet with its well known closing device is employed, with which cooperate a relatively few special parts employed to directly engage the several work pieces.

For a complete understanding of this invention reference may be had to the accompanying drawings in which Figure 1 is an exploded perspective view of the collet and parts including the work pieces to be carried thereby.

Figure 2 is a fragmentary longitudinal cross sectional view through the gripping device.

Figure 3 is a cross sectional view on line 3—3 of Figure 2.

Figure 4 is a side elevation of a work piece clamping element.

Referring to the drawings, at 1 is shown a spring collet of usual construction which may have a tubular rear end 2 externally threaded as at 3 for the attachment thereto of the usual collet actuating sleeve 4. The opposite end portion of the collet is split as at 5 to form a spring end portion which can be sprung inwardly into clamping engagement with the work pieces as will later appear. The spring end portion of this collet has an outwardly flaring outer face 6 which cooperates with a reversely tapered face 7 of its cooperating closing member, so that when the collet is drawn backwardly relative thereto these faces crowd the spring end portion of the collet inwardly into clamping engagement with the work pieces.

Within the collet is secured by any suitable means a mandrel 10. As shown, this mandrel 10 has a split head portion 11 which may be expanded by the engagement in a tapered opening 12 in its outer end of a matingly tapered head 13 of a screw 14. By these means the mandrel may be expanded into tight engagement with the rear end of the collet and be firmly attached thereto.

This mandrel 10 has a reduced diameter shank portion 16 extending forwardly therefrom and within the collet 1, and is also provided with a longitudinally extending key 17. This key 17 extends through a keyway 18 in an inwardly extending end flange 19 of a split sleeve 20. As shown best in Figure 4, this sleeve 20 is slit along a diagonal as at 21, and the key 17 when in place therein extends across this slit 21 between its ends.

The outer end of the sleeve 20 may be formed with an outwardly extending flange 22 which may seat against the outer spring end of the collet 1 as shown in Figure 2, this serving to position the split sleeve 20 lengthwise within the collet and with the head 11 of the mandrel engaging the opposite end at the inwardly directed flange 19.

The split sleeve 20 and the shank portion 16 define between them an annular space 25 within which may be positioned the work pieces 26 arranged in circular array about the axis of the parts and positioned on either side of the key 17. The inner ends of the work pieces may be seated against the inner face of the inwardly directed flange 19 so that their inner ends are arranged in predetermined fixed position with reference to the length of the collet. When the lathe carrying the collet is provided with a tail stock, this stock may be provided with a rubber bumper 27 which may be brought up against the outer ends of the work pieces to insure that they are in contact with the flange 19 before the tooling is attempted. When the collet is tightened within its closing element, this sleeve is drawn together, clamping the work pieces into the annular arrangement shown, against the shank portion 16, and as the key 17 extends across the split portion 21, this split portion does not in any way interfere with the proper positioning and holding of the work pieces.

It will be seen that all the work pieces are carried in circular array about the axis of the collet and extend outwardly therefrom so that when the spindle carrying the collet is rotated, and a cutting off tool indicated generally at 30 is presented to the work pieces, they may be cut off all to the same lengths. It may also be noted that since the work pieces are arranged eccentric to the rotational axis of the work holder there is no liability of the formation of rough broken edge portions as often occurs where a work piece rotated about its own axis is being cut off.

From the foregoing description of an embodiment of this invention, it should be evident to those skilled in the art that various changes and modifications may be made therein without departing from the spirit or scope of this invention.

I claim:

1. In combination with a spring collet and cooperating contracting means, of a mandrel adapted to be secured within said collet and having a reduced diameter shank portion extending into the spring portion of said collet, a split sleeve within said collet and normally spaced from said reduced diameter portion to provide therewith an annular work piece receiving space, said sleeve having a keyway therein, and a key carried by said mandrel engaging said keyway and extending through said space between adjacent work pieces positioned therein.

2. In combination with a spring collet and cooperating contracting means, of a mandrel adapted to be secured within said collet and having a head and a reduced diameter shank portion extending from said head into the spring portion of said collet, a diagonally split sleeve having an inwardly flanged inner end for seating on said head and normally spaced from said shank portion to provide therewith an annular work piece receiving space, said sleeve having a keyway therein, said inwardly flanged end forming a seat for engagement with the inner ends of such work pieces, and a key carried by said mandrel engaging in said keyway and extending through said space between adjacent work pieces positioned therein.

3. In combination with a spring collet and cooperating contracting means, of a mandrel adapted to be secured within said collet and having a head and a reduced diameter shank portion extending from said head into the spring portion of said collet, a diagonally split sleeve having an inwardly flanged inner end for seating on said head and normally spaced from said shank portion to provide therewith an annular work piece receiving space, said sleeve having a keyway therein extending across said split portion, said inwardly flanged end forming a seat for engagement with the inner ends of such work pieces, and a key carried by said mandrel engaging in said keyway and extending through said space and across said split portion between adjacent work pieces positioned in said space.

4. In combination with a spring collet and cooperating contracting means, of a mandrel adapted to be secured within said collet and having a head and a reduced diameter shank portion extending from said head into the spring portion of said collet, a diagonally split sleeve having an inwardly flanged inner end for seating on said head and an outwardly extending flange at its opposite end adapted to seat on the spring end portion of said collet, and normally spaced from said shank portion to provide therewith an annular work piece receiving space, said inwardly flanged end forming a seat for engagement with the inner ends of such work pieces, said sleeve having a keyway therein extending across said split portion and a longitudinally extending key carried by said mandrel engaging in said keyway and extending through said space and across said split portion and between adjacent work pieces positioned in said space.

References Cited in the file of this patent

UNITED STATES PATENTS

| | | |
|---|---|---|
| 2,161,939 | Sutton | June 13, 1939 |
| 2,396,504 | Grey | Mar. 12, 1946 |
| 2,502,719 | Haley et al. | Apr. 4, 1950 |